United States Patent [19]

Brewer

[11] Patent Number: 4,480,091

[45] Date of Patent: Oct. 30, 1984

[54] PROCESS FOR PREPARING CELLULOSE SULFATE ESTERS

[75] Inventor: Richard J. Brewer, Kingsport, Tenn.

[73] Assignee: Eastman Kodak Company, Rochester, N.Y.

[21] Appl. No.: 547,262

[22] Filed: Oct. 31, 1983

[51] Int. Cl.$^3$ .............................................. C08B 5/14
[52] U.S. Cl. ..................................................... 536/59
[58] Field of Search ............................. 536/59, 32, 33

[56] References Cited

U.S. PATENT DOCUMENTS

| | | | |
|---|---|---|---|
| 2,582,009 | 1/1952 | Crane | 536/59 |
| 2,622,079 | 12/1952 | Crane | 536/59 |
| 3,000,876 | 9/1961 | Touey et al. | 536/33 |
| 3,503,956 | 3/1970 | Rowley et al. | 536/59 |
| 3,624,069 | 11/1971 | Schweiger | 536/33 |
| 3,702,843 | 11/1972 | Schweiger | 536/33 |
| 3,709,877 | 1/1973 | Tunc | 536/59 |
| 4,138,535 | 2/1979 | Schweiger | 536/33 |
| 4,242,506 | 12/1980 | Schweiger | 536/33 |
| 4,273,118 | 6/1981 | Smith | 536/59 |

FOREIGN PATENT DOCUMENTS 303493 8/1928 United Kingdom ................. 536/59

*Primary Examiner*—Ronald W. Griffin
*Attorney, Agent, or Firm*—Clyde L. Tootle; Daniel B. Reece, III

[57] ABSTRACT

The present invention relates to the preparation of water soluble cellulose sulfate esters. More particularly, it relates to an improved process of preparing cellulose sulfate esters wherein cellulose is slurried in dimethylformamide. To this cellulose-dimethylformamide slurry is then added liquid denitrogen tetroxide to form the cellulose nitrite ester. The cellulose nitrite ester is then converted to the water soluble cellulose sulfate ester by reacting with acetylsulfuric acid in an anhydrous reaction medium.

15 Claims, No Drawings

PROCESS FOR PREPARING CELLULOSE SULFATE ESTERS

The present invention relates to the preparation of water soluble cellulose sulfate esters. More particularly, it relates to an improved process of preparing cellulose sulfate esters wherein cellulose is slurried in dimethylformamide. To this cellulose-dimethylformamide slurry is then added liquid dinitrogen tetroxide to form the cellulose nitrite ester. The cellulose nitrite ester is then converted to the water soluble cellulose sulfate ester by reacting with acetylsulfuric acid in an anhydrous reaction medium.

Cellulose sulfate esters are well known water soluble polymers useful in such applications as food additives (thickeners, enhancers), textiles (sizings), photographic coatings, and enhanced oil recovery (viscosity modifiers). One method known in the art for preparing such cellulose sulfate esters is by reacting cellulose with relatively large amounts of sulfuric acid (8-10 parts/part cellulose) in an inert diluent such as toluene with isopropanol to modify the reactivity of the sulfuric acid. Such a method is fibrous (heterogeneous) esterification during which the cellulose does not dissolve and is thus nonuniformly substituted with sulfate ester groups. Such prior art methods also result in a low degree of substitution (<1.0) of sulfate ester groups on the cellulose polymer backbone and also result in a substantial cellulose molecular weight reduction due to the large amounts of sulfuric acid used.

Another fibrous prior art method of preparing cellulose sulfate esters involves reacting cellulose in a fibrous state in dimethylformamide (DMF) with a preformed 1:1 complex of sulfur trioxide:dimethylformamide ($SO_3$:DMF). Also, in another method prior to sulfation, the cellulose may be reacted with dinitrogen tetroxide ($N_2O_4$) in DMF solvent to form the soluble cellulose nitrite ester which is then reacted with the $SO_3$:DMF complex to form cellulose sulfate esters. Both of these methods, however, require the use of $SO_3$ which is difficult to handle (fumes profusely when contacted with air) and reacts violently when contacted with water and many common organic solvents. It would therefore be an advance in the state of the art to provide a process for providing cellulose sulfate esters which were uniformly sulfated, did not have a substantial molecular weight reduction, and did not require the use of anhydrous sulfuric acid.

In accordance with the present invention, it has been discovered that cellulose can be slurried in dimethylformamide (DMF). To this slurry of cellulose-DMF is added dinitrogen tetroxide ($N_2O_4$) to form the cellulose nitrite ester. This cellulose nitrite ester can then be easily converted to water soluble cellulose sulfate esters by reaction with a mixture of sulfuric acid-acetic anhydride (acetylsulfuric acid). The sulfuric acid-acetic anhydride mixture (acetylsulfuric acid) is easily prepared and handled and results in a uniformly substituted high viscosity cellulose sulfate ester. The method according to this invention also requires less sulfuric acid (stoichiometric amounts) to achieve the desired levels of sulfate ester substitution. Moreover, it has also been found that the use of the acetic anhydride-sulfuric acid mixture (acetylsulfuric acid) as sulfating reagent does not cause acetylation of the cellulose concurrent with the sulfation reaction. Therefore, the cellulose sulfate ester products obtained according to the present invention contain no detectable acetyl groups as opposed to the previously known fibrous sulfation methods employing acetic acid, mixtures of acetic anhydride-sulfuric acid and sodium acetate which give cellulose sulfate esters containing up to 20-21% by weight combined acetyl groups.

The acetic anhydride performs two functions. One function is to remove the water present in the reaction system. This water may be present as moisture in the cellulose, present in the reaction solvent (DMF) or present in the sulfuric acid (normally 96% pure, with about 4% water). In addition, a second function of the acetic anhydride is to convert the sulfuric acid substantially to acetylsulfuric acid.

Cellulose which can be used in this invention is cellulose, cellulose derivatives containing at least one free hydroxyl group and mixtures thereof containing about 85 to 98 percent alpha-cellulose content, preferably about 88 to 92 percent. Such cellulosics include viscose or paper grade pulps, cotton linters, and the like, for example.

The esterification (sulfation) reactions may be carried out over a temperature range of from about 0° C. to ~40° C., preferably about 25° C., depending on the desired viscosity of the cellulose sulfate ester product. For example, the higher reaction temperatures provide lower viscosity cellulose sulfate esters with a corresponding lower degree of sulfate ester substitution. The lower viscosity of the esters results from cellulose polymer depolymerization and the lower degree of sulfate ester substitution results from conversion of acetylsulfuric acid to sulfoacetic acid as the reaction temperature is increased above about 30° C.

The degree of sulfate ester substitution on the cellulose polymer backbone can be controlled conveniently by merely controlling the amount of sulfating reagent employed. For example, a stoichiometric amount of sulfuric acid (as acetylsulfuric acid) is added for the desired level of sulfate ester substitution. For example, a 1 molar amount of acetylsulfuric acid provides a sulfate ester having a level of sulfate ester substitution of approximately 1.0. The maximum amount of substitution which can be obtained is a level of sulfate substitution of about 2. In order to obtain water soluble cellulose sulfate esters, such esters are generally achieved with about 0.3 to about 0.4 degree of substitution (degree of substitution is defined as the number of sulfate ester groups per anhydroglucose unit of the cellulose polymer backbone).

The amount of DMF solvent employed may be from about 6 parts per part of cellulose to about 20 parts per part of cellulose, preferably 10-15 parts per part of cellulose. Less than 6 parts DMF per part of cellulose does not adequately wet and swell the cellulose for proper reaction and results in a reaction media which is difficult to stir. The use of more than 20 parts DMF per part of cellulose is not detrimental to the sulfation reaction but is uneconomical due to solvent recovery considerations.

The amount of $N_2O_4$ employed may be varied from about 1.5 mole per mole of cellulose anhydroglucose units to about 3 moles per mole of anhydroglucose units. The preferred amount of $N_2O_4$ is from about 1.5 to 2.5 moles per mole of anhydroglucose unit. The use of less than about 1 mole $N_2O_4$ per mole of anhydroglucose unit results in a cellulose nitrite ester which is insoluble in DMF and thus is not uniformly reacted during the subsequent sulfation reaction. The use of more than about 3 moles $N_2O_4$ per mole of anhydroglucose unit is uneconomical and unnecessary for good reaction and solubility of the resulting cellulose nitrite ester.

The amount of sulfating agent used in the process is therefore generally from about 0.3 to about 3.0 moles of acetyl sulfuric acid per mole of cellulose anhydroglucose unit depending on the desired degree of sulfate ester substitution. For example, 0.5 mole of acetyl sulfuric acid per 1 mole of cellulose anhydroglucose units provides a cellulose sulfate ester having about 0.5 degree of substitution. Likewise, 2.0 to 3.0 moles of acetylsulfuric acid per mole of cellulose anhydroglucose units provides a cellulose sulfate ester having about 2.0 degrees of substitution.

Generally, the amount of acetic anhydride used to prepare the acetyl sulfuric acid sulfating agent is from about 0.6 to about 3 moles per mole of sulfuric acid, preferably about 1.5 moles. The amount of acetic anhydride is always in an excess of that amount calculated to provide the acetyl sulfuric acid sulfating agent and the amount required to remove the water present in the reaction system.

The reaction can be carried out over a period of time of from about 0.5 to about 2 hours, preferably about 1 to about 1.5 hours, to prepare the cellulose sulfate esters depending on the amount of sulfating agent present and the temperature at which the reaction is being carried out.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 50 grams (0.31 moles) of cellulose wood pulp chips having an alpha cellulose content of 88 to 92 percent is placed in a 3-liter round 3-neck flask equipped with a stirrer, thermometer, and dropping funnel. About 1000 grams (13.7mole) dimethyl formamide (DMF) was added to the flask and the slurry stirred at ambient temperature for a period of 1 to 2 hours. The cellulose-DMF slurry was cooled to a temperature of 25° C. or less and about 85.6 grams (0.93 mole) of $N_2O_4$ liquid cooled to a temperature of 0° C. in an ice bath was added dropwise over a 10 to 20 minute period while maintaining the slurry temperature at 25° C. or less. The slurry was then stirred and reacted at a temperature of 25° C. or less for one hour. About 25.5 grams (0.26 moles) sulfuric acid premixed with 50 grams (0.49 mole) acetic anhydride was added dropwise over a 10 to 20 minute period while maintaining the reaction mixture at a temperature of 25° C. or less. (During the mixing of acetic anhydride with the sulfuric acid, the reaction temperature should be maintained at $\leq 25°$ C. to minimize conversion of acetylsulfuric acid to sulfoacetic acid). The sulfation reaction was allowed to proceed at $\leq 25°$ C. for 60 minutes after which the reaction solution was diluted with an equal volume of ice water and then neutralized with 25-30 weight percent aqueous sodium hydroxide to pH 8-9. The solution was then poured into well stirred methanol to precipitate the sodium cellulose sulfate ester which was then thoroughly washed in methanol and dried.

EXAMPLES 2-15

The following examples illustrate the range of water soluble cellulose sulfate esters which can be prepared using the improved esterification process described in this invention. The process is the same as defined in Example 1 except that the amount and form of sulfuric acid are changed, the amount of acetic anhydride is changed, and the temperature is changed, all as indicated in the runs in the table.

TABLE I

Preparation of Cellulose Sulfate Esters Using Acetyl Sulfuric Acid In $DMF^a$—$N_2O_4{}^b$ Mixtures

| | Reaction Conditions | | | | | Cellulose Sulfate Ester Analysis | | | | | |
|---|---|---|---|---|---|---|---|---|---|---|---|
| | Cellulose$^c$, | $N_2O_4{}^b$, | $H_2SO_4{}^d$, | Acetic Anhydride, | Temp., | Sulfur, | Sulfate Ester | Solubility | Brookfield Viscosity, cp$^e$ | | |
| No. | Mole | Mole | Mole | Mole | °C. | Wt. % | D.S. | In Water | 0.5% | 1.0% | 2.0% |
| 2 | 0.12 | 0.35 | 0.26 | None | $\leq 15°$ | <2 | <0.1 | Insoluble | — | — | — |
| 3 | 0.12 | 0.35 | 0.14$^f$ | None | $\leq 15°$ | <2 | <0.1 | Insoluble | — | — | — |
| 4 | 0.12 | 0.35 | 0.26$^f$ | None | $\leq 15°$ | 14.15 | 1.30 | Poor$^h$ | 35$^h$ | 115$^h$ | 920$^h$ |
| 5 | 0.12 | 0.35 | 0.26 | 0.06 | $\leq 15°$ | 2.69 | 0.17 | Insoluble | — | — | — |
| 6 | 0.12 | 0.35 | 0.26 | 0.10 | $\leq 15°$ | 3.04 | 0.20 | Insoluble | — | — | — |
| 7 | 0.12 | 0.35 | 0.26 | 0.15$^g$ | $\leq 15°$ | 13.93 | 1.28 | Excellent | 40 | 90 | 650 |
| 8 | 0.12 | 0.35 | 0.26 | 0.25 | $\leq 15°$ | 14.49 | 1.36 | Excellent | 49 | 140 | 862 |
| 9 | 0.12 | 0.35 | 0.26 | 0.25 | $\leq 5°$ | 16.36 | 1.72 | Excellent | 43 | 120 | 800 |
| 10 | 0.12 | 0.35 | 0.26 | 0.25 | 25° | 13.32 | 1.16 | Excellent | 25 | 50 | 260 |
| 11 | 0.12 | 0.35 | 0.26 | 0.25 | 40° | 12.71 | 1.10 | Excellent | 25 | 45 | 150 |
| 12 | 0.12 | 0.35 | 0.07 | 0.10 | $\leq 15°$ | 6.23 | 0.40 | Excellent | 215 | 845 | 19000 |
| 13 | 0.12 | 0.24 | 0.14 | 0.15 | $\leq 15°$ | 10.55 | 0.80 | Excellent | 95 | 415 | 6000 |
| 14 | 0.12 | 0.18 | 0.18 | 0.25 | $\leq 15°$ | 15.16 | 1.48 | Excellent | 60 | 170 | 865 |
| 15 | 0.12 | 0.18 | 0.24 | 0.30 | $\leq 15°$ | 16.46 | 1.72 | Excellent | 50 | 125 | 635 |

$^a$DMF = dimethylformamide.
$^b$$N_2O_4$ = dinitrogen tetroxide.
$^c$Cotton linters cellulose.
$^d$$H_2SO_4$ = 96% sulfuric acid (contains ~4% water).
$^e$Brookfield viscosities determined in distilled water at room temperature using spindle No. 3.
$^f$Fuming sulfuric acid (~20% xs $SO_3$) was used as sulfating reagent in these reactions.
$^g$10% xs of acetic anhydride calculated to destroy the moisture present in the reaction media.
$^h$Much gel and suspended fibrous material was present in these solutions.

Examples 2-7 in Table I show that without sufficient acetic anhydride the sulfation reaction does not provide the desired product. Examples 3 and 4 show that even fuming sulfuric acid (~20% excess $SO_3$ present) without the acetic anhydride does not provide the desired water soluble cellulose sulfate esters. Examples 8-11 illustrate the range of cellulose sulfate ester viscosities which can be achieved by varying the reaction temperature from ≤ 5° C. to 40° C. Examples 13-15 illustrate the different degrees of substitution of sulfate ester which can be achieved by varying the stoichiometric amount of acetylsulfuric acid sulfating reagent.

The cellulose sulfate esters prepared by this improved process are water soluble and have potential applications in foods (thickeners), textiles (sizings), and enhanced oil recovery (viscosity modifiers).

The invention has been described in detail with particular reference to preferred embodiments thereof, but it will be understood that variations and modifications can be effected within the spirit and scope of the invention.

I claim:

1. A process for preparing cellulose sulfate esters from cellulose, cellulose derivatives containing at least one free hydroxyl group and mixtures thereof which comprises slurrying said cellulose, derivatives or mixtures thereof in at least about six parts of dimethylformamide per part cellulose component, reacting said slurry with at least 1.5 mole dinitrogen tetroxide per mole cellulosic anhydroglucose unit to form cellulose nitrite ester, reacting said cellulose nitrite ester with at least about 0.3 mole acetylsulfuric acid and adequate acetic anhydride to maintain the reaction mixture in an anhydrous state at a temperature of about 0° C. to about 40° C. to form water soluble cellulose sulfate esters.

2. A process for preparing cellulose sulfate esters according to claim 1 wherein said cellulose, cellulose derivatives containing at least one free hydroxyl group and mixtures thereof are cellulose containing about 85 to 98 percent alpha-cellulose content.

3. A process for preparing cellulose sulfate esters according to claim 2 wherein said dimethylformamide is used in an amount of about 6 parts to 20 parts per part of cellulose.

4. A process for preparing cellulose sulfate esters according to claim 3 wherein said dinitrogen tetroxide is used in an amount of about 1.5 mole to 3 moles per mole of cellulosic anhydroglucose units.

5. A process for preparing cellulose sulfate esters according to claim 4 wherein said acetylsulfuric acid is used in an amount of about 0.3 to about 3.0 mole per mole of cellulosic anhydroglucose units.

6. A process for preparing cellulose sulfate esters from cellulose which comprises slurrying said cellulose in at least about six parts of dimethylformamide per part cellulose component, reacting said slurry with at least 1.5 mole dinitrogen tetroxide per mole cellulosic anhydroglucose unit to form cellulose nitrite ester, reacting said cellulose nitrite ester with at least about 0.3 mole acetylsulfuric acid and adequate acetic anhydride to maintain the reaction mixture in an anhydrous state at a temperature of about 0° C. to about 40° C. to form water soluble cellulose sulfate esters.

7. A process for preparing cellulose sulfate esters according to claim 6 wherein said cellulose contains about 85 to 98 percent alpha-cellulose content.

8. A process for preparing cellulose sulfate esters according to claim 7 wherein said dimethylformamide is used in an amount of about 6 parts to 20 parts per part of cellulose.

9. A process for preparing cellulose sulfate esters according to claim 8 wherein said dinitrogen tetroxide is used in an amount of about 1.5 mole to 3 moles per mole of cellulosic anhydroglucose units.

10. A process for preparing cellulose sulfate esters according to claim 9 wherein said acetylsulfuric acid is used in an amount of about 0.3 to about 3.0 mole per mole of cellulosic anhydroglucose units.

11. A process for preparing cellulose sulfate esters from cellulose containing about 85 to 98 percent alpha-cellulose content which comprises slurrying said cellulose in at least about six parts of dimethylformamide per part cellulose component, reacting said slurry with at least 1.5 mole dinitrogen tetroxide per mole cellulosic anhydroglucose unit to form cellulose nitrite ester, reacting said cellulose nitrite ester with at least about 0.3 mole acetylsulfuric acid and adequate acetic anhydride to maintain the reaction mixture in an anhydrous state at a temperature of about 0° C. to about 40° C. to form water soluble cellulose sulfate esters.

12. A process for preparing cellulose sulfate esters according to claim 11 wherein said cellulose contains about 88 to 92 percent alpha-cellulose content.

13. A process for preparing cellulose sulfate esters according to claim 12 wherein said dimethylformamide is used in an amount of about 10 parts to 15 parts per part of cellulose.

14. A process for preparing cellulose sulfate esters according to claim 13 wherein said dinitrogen tetroxide is used in an amount of about 1.5 mole to 2.5 moles per mole of cellulosic anhydroglucose units.

15. A process for preparing cellulose sulfate esters according to claim 14 wherein said acetylsulfuric acid is used in an amount of about 0.3 to about 3.0 mole per mole of cellulosic anhydroglucose units.

* * * * *